United States Patent
Arik et al.

(10) Patent No.: US 12,061,084 B2
(45) Date of Patent: Aug. 13, 2024

(54) GEODETIC LEVELLING STAFF AND METHOD OF USE THEREOF

(71) Applicant: OZYEGIN UNIVERSITESI, Istanbul (TR)

(72) Inventors: Mehmet Arik, Istanbul (TR); Cemal Ozer Yigit, Kocaeli (TR); Mehmet Halis Saka, Kocaeli (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 614 days.

(21) Appl. No.: 17/294,708

(22) PCT Filed: Nov. 23, 2018

(86) PCT No.: PCT/TR2018/050719
§ 371 (c)(1),
(2) Date: May 18, 2021

(87) PCT Pub. No.: WO2020/106231
PCT Pub. Date: May 28, 2020

(65) Prior Publication Data
US 2022/0011109 A1      Jan. 13, 2022

(51) Int. Cl.
*G01C 15/06*     (2006.01)
*G01C 9/06*      (2006.01)
(Continued)

(52) U.S. Cl.
CPC .............. *G01C 15/06* (2013.01); *G01C 9/06* (2013.01); *G01C 9/32* (2013.01); *H04B 5/72* (2024.01);
(Continued)

(58) Field of Classification Search
CPC . G01C 15/06; G01C 9/06; G01C 9/32; G01C 2009/066; G01C 19/36; H04B 5/0031; H04B 5/0037; H04W 4/80
See application file for complete search history.

(56) References Cited

U.S. PATENT DOCUMENTS 4,715,714 A * 12/1987 Gaechter ................ G01C 15/00
                                                          356/400
5,055,666 A * 10/1991 Miyahara ............. G01C 15/002
                                                        356/152.1
(Continued)

FOREIGN PATENT DOCUMENTS

CN    104807439 B  *  2/2017  .............. G01C 5/00
CN    104807439 B     2/2017
(Continued)

*Primary Examiner* — Yaritza Guadalupe-McCall
(74) *Attorney, Agent, or Firm* — Bayramoglu Law Offices LLC

(57) ABSTRACT

A geodetic levelling staff, a method for measuring a height with the geodetic levelling staff and a system including the geodetic levelling staff and a level are provided. The geodetic levelling staff includes a circular level that indicates whether the geodetic levelling staff is in a vertical position, a level detection unit for detecting a bubble position of the circular level, a control circuit that receives detected data performed by the level detection unit and transmits the detected data to a near field communication tool, the near field communication tool for performing a communication from the geodetic levelling staff to the level according to the detected data received from the control circuit, wherein the level operates according to the detected data received from the near field communication tool.

20 Claims, 2 Drawing Sheets

(51) Int. Cl.
  *G01C 9/32* (2006.01)
  *H04B 5/72* (2024.01)
  *H04B 5/79* (2024.01)
  *H04W 4/80* (2018.01)
(52) U.S. Cl.
  CPC ............... *H04B 5/79* (2024.01); *H04W 4/80*
    (2018.02); *G01C 2009/066* (2013.01)

(56) References Cited

U.S. PATENT DOCUMENTS

| | | | | |
|---|---|---|---|---|
| 5,537,200 | A * | 7/1996 | Kumagai | G01C 15/002 |
| | | | | 356/139.08 |
| 8,539,685 | B2 * | 9/2013 | Amor | G01C 15/002 |
| | | | | 33/290 |
| 8,864,327 | B2 * | 10/2014 | Gregory | F21K 9/61 |
| | | | | 362/120 |
| 2001/0019101 | A1 * | 9/2001 | Ohtomo | G01C 15/06 |
| | | | | 250/206.1 |
| 2002/0073562 | A1 * | 6/2002 | Brink | G01C 15/06 |
| | | | | 33/293 |
| 2007/0017111 | A1 * | 1/2007 | Hoback | G01B 3/1084 |
| | | | | 33/771 |
| 2012/0195060 | A1 * | 8/2012 | Gregory | F21K 9/61 |
| | | | | 362/555 |
| 2022/0011109 | A1 * | 1/2022 | Arik | G01C 9/06 |
| 2024/0093993 | A1 * | 3/2024 | Jensen | G01C 15/006 |

FOREIGN PATENT DOCUMENTS

| | | | |
|---|---|---|---|
| GB | 1058367 | A * | 12/1964 |
| GB | 1058367 | A | 2/1967 |
| JP | 2009025276 | A * | 2/2009 |
| JP | 2009025276 | A | 2/2009 |
| WO | WO-2017066836 | A1 * | 4/2017 |

* cited by examiner

GEODETIC LEVELLING STAFF AND METHOD OF USE THEREOF

CROSS REFERENCE TO THE RELATED APPLICATIONS

This application is the national stage entry of International Application No. PCT/TR2018/050719, filed on Nov. 23, 2018, the entire contents of which are incorporated herein by reference.

TECHNICAL FIELD

The present invention relates to a levelling staff and a level for a geodetic levelling. More specifically, the present invention relates to lighted levelling staff which is used to determine the difference in height between points or heights of points above a datum surface.

BACKGROUND

Levelling is an optical method that provides measurements of geodetic heights using a level that is configured to read a levelling staff for measuring and calculating elevation at selected positions. Nevertheless, it is essential that the readings should be taken when the levelling staff is vertical. If the levelling staff is not vertical, the reading will not be accurate as it should be. Some levelling staffs are further equipped with a bubble which helps the surveyor keeps it vertically by ensuring the position of the bubble at the center. But deciding whether the levelling staff is in the vertical position depends solely on the opinion of the surveyor brings with it incorrect measurement data due to human error. In the prior art, the surveyor holds the levelling staff, sees the bubble is at the center of the levelling staff, decides the levelling staff is in the vertical position, and gives the information to the operator (another surveyor) who perform measurement via the level when the levelling staff is ready for measurement. At this stage, the vertical position of the levelling staff may change. Moreover, the surveyor holding the levelling staff may see the bubbles position wrongly. This situation is a condition that can often lead to human errors. The communication between the two persons who hold the levelling staff and the level is also very important and open to human errors. Beside the reading errors arising from the human factors, environmental factors, such as measurements made in windy or low light or dark conditions, make the reading of levelling staff very difficult. Therefore, there is a significant amount of risk when performing geodetic levelling due to the positioning of the levelling staff in the right orientation.

One of the factors that increase the above mentioned risk is performing such measurements in low-light or no-light (e.g. at night, darkness) conditions. In darkness, holding the levelling staff in a vertical position by observing the level bubble brings an additional difficulty both for the surveyor who holds the levelling staff and for the surveyor who will perform the measurements via the level accordingly.

Prior art provides alternatives for overcoming these types of problems related to geodetic levelling methods in low to no light conditions. However, most of them merely focus on illumination of the levelling staffs, rather than the enhancement of measurement accuracy when operating in environments that are not appropriate for optical methods and incorrect measurement data due to human error.

U.S. Pat. No. 8,864,327 B2 presents an optically readable surveying staff which is provided with adjustable lighting elements such that optical readings can be taken at night or in dark conditions. Nevertheless, the document remains incapable to provide any solutions for the other disadvantages, especially faced in dark conditions such as making a reliable observation on the orientation of the staff to be measured when performing optical distance measurements.

Accordingly, US 2007017111 A1 provides a tape measure that has an attached pair of light enhancing reflective surfaces for use with a laser light measurement instrument. The characteristics of this measuring device aid its readable qualities when a light source is directed towards it and a primary characteristic is the aid to determine unit measurement with the use of a laser light at greater distances from the light source and in a shorter time with less effort than with currently used methods and devices.

US 2002073562 A1 also provides a lighted survey staff which permits surveying in low ambient light conditions that not employs expensive laser lights, powerful solar lights and such. However, this document also fails to provide any solution for an accurate geodetic distance measurement in low light conditions.

Hence, in view of the above cited prior art documents, there is a need for a geodetic levelling staff for to enable a surveyor to perform accurate measurement while minimizing human error in low-light or no-light conditions. Considering the industry related to the geodetic levelling, such levelling staff shall also be inexpensive, affordable and easy to produce.

SUMMARY

The present invention provides a geodetic levelling staff comprising at least one circular level, at least one level detection unit, at least one control circuit, at least one near field communication tool and at least one power source wherein the power source provides the power to the control circuit, the detection unit and the near field communication tool.

The present invention provides a geodetic levelling staff further comprising at least one lighting system. The lighting system's power is also provided by the power source.

The present invention further provides a method for measuring the geodetic heights wherein the method comprises the following steps:
a) sending the light beam directly to the center of the circular level by a level detection unit,
b) detecting the information that the levelling staff is in the vertical position by a level detection unit when the bubble is at the center of circular level,
c) collecting the detected data received from said level detection unit by a control circuit,
d) transmitting the detected data to a near field communication tool,
e) transmitting the detected data received from the control circuit to the level by the near field communication tool, and
f) performing a geodetic levelling by a level if the detected data transmitted from the near field communication tool to the level.

The present invention further provides a system for measuring the geodetic heights wherein said system comprises a lighted geodetic levelling staff according to the present invention and a level, wherein said staff comprises a circular level that indicates whether the levelling staff is in a vertical position, a level detection unit for detecting the bubble position of said level, a control circuit that receives the detected data performed by said level detection unit, transmits the detected data to a near field communication tool, a near field communication tool for performing a communication from the levelling staff to said level according to the detected data received from the control circuit, wherein the level operates according to said detected data received from the near field communication tool.

DETAILED DESCRIPTION OF THE EMBODIMENTS

Figure 1A:
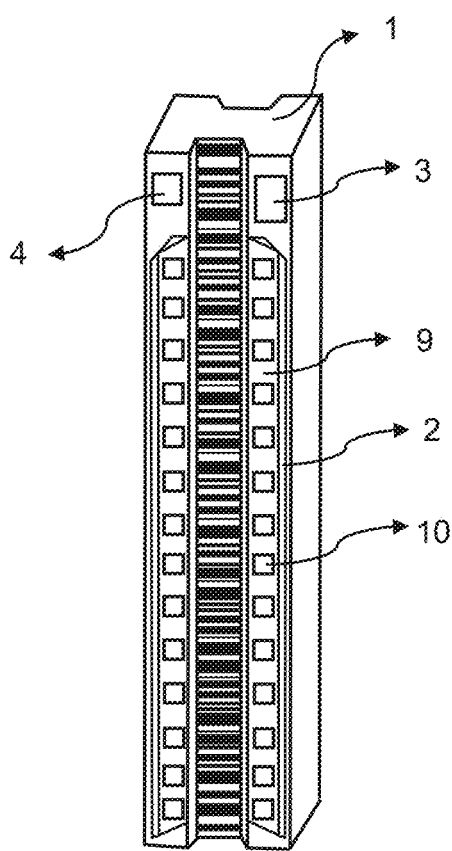
FIG. 1A is a front perspective view of a geodetic levelling staff associated with a lighting system.
Figure 1B:
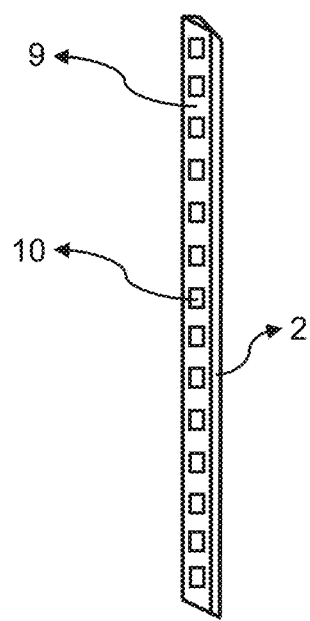
FIG. 1B illustrates a singular lighting system.
Figure 2A:
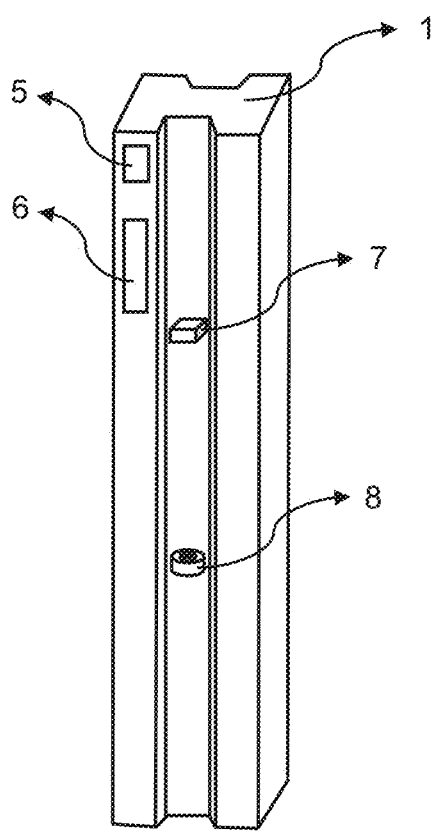
FIG. 2A is a back perspective view of a geodetic levelling staff.
Figure 2B:
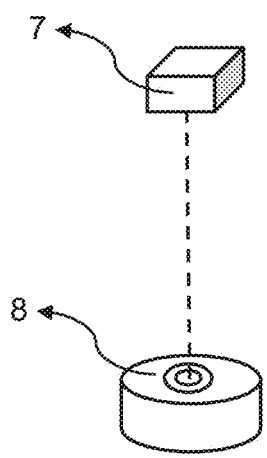
FIG. 2B illustrates a level detection unit (7) and a circular level (8) associated thereto.

The present invention relates to a geodetic levelling staff (I) having an upper section, a lower section and an elongated body between the upper and the lower section wherein the elongated body comprising a front surface provided with a measuring part on it, a back surface and at least one lateral surface.

As used herein, the "front surface" of the levelling staff (1) means the surface which is directly seen by the surveyor who uses the level and the "back surface" means the surface which is directly seen by the surveyor who holds the levelling staff (1).

Referring to the figures, the geodetic levelling staff (1) of the present invention comprising, at least one circular level (8) configured in the levelling staff (1), at least one level detection unit (7) positioned in alignment with the circular level (8) in which the detection unit (7) can directly see the circular unit (8), at least one control circuit (5) arranged to receive and transmit the detected data generated by said level detection unit (7), at least one near field communication tool (4) arranged on the levelling staff (1) to communicate with a level according to received detected data from control circuit (5) and at least one power source (6) wherein the power source (6) providing the power to the control circuit (5), the detection unit (7), lighting system (2) and the near field communication tool (4).

In a preferred embodiment of the present invention the geodetic levelling staff (1) further comprising at least one lighting system (2).

In a preferred embodiment of the present invention, the lighting system (2) is integrated and positioned longitudinally on both sides of the front surface of levelling staff (I) and each lighting system (2) comprises at least one lighting unit (10) on the surface of said lighting system (2). Lighting system (2) further comprises a mirror reflector (9) which is attached to said lighting system (2) so that the mirror reflector (9) is used to enhance the luminosity of the levelling staff (1) of the present invention. The power to the lighting system is provided by the power source.

In a preferred embodiment of the present invention, geodetic levelling staff (1) further comprising a measuring part that is positioned along a length of a front surface in between the two lighting systems (2).

In a preferred embodiment of the present invention, lighting system (2) enable to be read the levelling information on the measuring part by surveyor who uses the level in low light or no light conditions (caves, tunnels, night time, etc.).

In a preferred embodiment of the present invention, said lighted geodetic levelling staff (1) is further configured to send a signal to the level when the levelling staff (1) is in vertical position so that the surveyor can perform a geodetic measurement by means of a level accurately. Hence, an important advantage of the present invention is that the information about the whether the levelling staff (1) is in a vertical position can be transmitted to the surveyor and to the level from the levelling staff (1) according to the present invention. Thus, the level can perform accurate measurement while minimizing human error even in low-light or no-light conditions.

In a preferred embodiment of the present invention, the lighting unit (10) is spaced light emitting diode.

In a preferred embodiment of the present invention the geodetic levelling staff (1) further comprises a beacon (3) to signal to the surveyor using the level whether the levelling staff (1) is in vertical position and allow the surveyor to understand the exact moment of accurate measurement.

In a preferred embodiment of the present invention, the beacon (3) is positioned on the front surface.

In the preferred embodiment of the present invention, to be able to make accurate measurements, it is necessary to position the levelling staff (1) in a vertical direction to the reference surface. The exact vertical position of the levelling staff (1) is determined by means of a circular level (8) which has a bubble located therein. The information that the levelling staff (1) is in a completely vertical position is taken by placing the bubble exactly in the center of the circular level (8). The detected information about the position of the levelling staff (1) can be received by a level detection unit (7) which is adapted in a back surface of the levelling staff (1). The level detection unit (7) is positioned in alignment with said circular level (8) in which the level detection unit (7) can directly see it.

In a preferred embodiment of the present invention, the level detection unit (7) is a sensor that can transmit the light beam and detect the position of the bubble at the circular level (8). The level detection unit (7) transmits light beam directly to the central of the circular level (8) and the distance between center and level detection unit (7) is measured by the light beam reflected from the center of the circular level (8). The distance measured by the level detection unit (7) reached to maximum value when the bubble is at the center of circular level (8). The measured distance when the bubble is at the center of the circular level (8) is always longer than the measured distance when the bubble is not at the center of the circular level (8). Since the radius of the bubble is known, the distance at the moment when this bubble is at the center of the circular level (8) can be determined. In this way, when the distance measured with the light beam sent from the detection unit (7) reaches the maximum value, it is determined that the bubble is exactly at the center of the circular level (8) and the detection unit (7) receives the information that the levelling staff (I) is in a vertical position.

In the preferred embodiment of the present invention, a control circuit (5) is connected to a lighting system (2), to a near field communication tool (4), to a beacon (3) or to a level detection unit (7). The control circuit (5) collects the detected data received from the level detection unit (7). The detected data gives an information about the position of the bubble is at center or not. Therefore the information is binary.

In a preferred embodiment of the present invention, if the detected data indicates that the bubble is at the center of the circular level (8), the control circuit (5) turns the lighting system (2) thereby enabling an accurate geodetic levelling for example in a dark conditions.

In a preferred embodiment of the present invention, the beacon is flashed by the control circuit (5) or changes the color with the detected data that received from the level detecting unit (7), if the detected data indicates that the bubble is at the center of the circular level (8), the beacon (3) flashes or changes the color to inform the surveyor that levelling staff is ready for the measurement.

In a preferred embodiment of the present invention, the control circuit (5) also transmits the detected data to a near field communication tool (4) The detected data gives the information about whether the bubble is at the center of circular level (8) or not. Afterwards, the near field communication tool (4) transmits the detected data to a level that deploys a software program to read the received data and operates the level accordingly.

In another embodiments of the present invention, the near field communication tool (4) is using zigbee transmission and/or bluetooth transmission and/or wireless fidelity transmission technologies.

In another embodiment of the present invention wireless communication tools are used as a near field communication tool for transferring data to close distances (1 m to 100 m).

In a preferred embodiment of the present invention, the near field communication tool (4) is preferably using a bluetooth transmission.

In the preferred embodiment of the present invention, if the detected data transmitted from the near field communication tool (4) to receiver, indicates that the levelling staff is in the vertical position, then a software program deployed by the level allows the level to perform the measurement. In another scenario, the transmitted data indicates that the levelling staff is not in the vertical position, thereby the software program of the level does not allow the level to perform the measurement. Thus, this prevent operator from accidentally or intentionally mistaken measurement.

In another aspect, the present invention also relates to a method of a geodetic levelling The method comprises the following steps:
a) sending the light beam directly to the center of the circular level (8) by a level detection unit (7),
b) detecting the information that the levelling staff is in the vertical position by a level detection unit (7) when the bubble is at the center of circular level (8),
c) collecting the detected data received from said level detection unit (7) by a control circuit
d) transmitting the detected data to a near field communication tool (4),
e) transmitting the detected data received from the control circuit (5) to the level by the near field communication tool (4), and
f) performing a geodetic levelling by a level if the detected data, transmitted from the near field communication tool (4) to the level, indicates that the bubble of the level is at the center.

In another aspect, the method of a geodetic levelling with a geodetic levelling staff (1) is further comprising the following step,
turning a lighting system (2) on by the control circuit (5) if the detected data indicates that the bubble of the level is at the center.

In another aspect, the method of a geodetic levelling with a geodetic levelling staff (1) is further comprising the following step,
flashing the beacon (3) by the control circuit (5) while/if the detected data indicates that the bubble of the level is at the center.

In another aspect, the present invention also relates to a system which comprises a level and a geodetic levelling staff (1) to perform a geodetic levelling. Said geodetic levelling staff (1) comprises a circular level (8) that indicates whether the levelling staff (1) is in a vertical position, a level detection unit (7) for detecting the bubble position at the circular level (8), a control circuit (5) that receives the detected data performed by said level detection unit (7) transmits the detected data to a near field communication tool (4), the near field communication tool (4) for performing a communication from the staff (1) to said level according to the detected data received from the control circuit (5), wherein the level operates according to the detected data received from the near field communication tool (4).

In another aspect, the present invention also relates to a system further comprising a lighting system (2) which is turned on by the control circuit (5) if the detected data indicates that the bubble is at the center of circular level (8) another aspect, the present invention also relates to a system which further comprises a beacon (3) to signal to a surveyor whether the levelling staff (1) is in vertical position or not and allow the surveyor to understand the exact moment of accurate measurement.

In another aspect, the present invention also relates to a system further comprising, the level comprising a receiver to communicate with the near field communication tool (4). The level also comprises a software program to communicate with a near field communication tool (4).

The present invention can be utilized in fields such as cartography, construction, mining, geophysics, geosciences where geodetic levelling is necessary. More specifically, the present invention has an industrial applicability in areas including but not limited to; establishment of geodetic networks, production of critical topographic maps, highway projects, railway projects, tunnels and tube tunnels projects, water delivery channel projects.

What is claimed is:
1. A geodetic levelling staff, comprising:
at least one circular level configured in the geodetic levelling staff,
at least one level detection unit positioned in an alignment with the at least one circular level, wherein the at least one level detection unit directly sense the at least one circular level,
at least one control circuit arranged to receive and transmit detected data generated by the at least one level detection unit,
at least one near field communication tool arranged on the geodetic levelling staff to communicate with a level according to the detected data from the at least one control circuit, and
at least one power source providing a power to the at least one control circuit,
the at least one level detection unit and the at least one near field communication tool,
wherein the at least one control circuit is configured to transmit data wirelessly from the geodetic levelling staff to the level, via the at least one near field communication tool, the transmitted data preventing the level from performing a measurement in response to the geodetic levelling staff being in a position other than a vertical position, and the transmitted data permitting the level to perform a measurement when the geodetic levelling staff is in a vertical position.

2. The geodetic levelling staff according to claim 1, further comprising at least one lighting system.

3. The geodetic levelling staff according to claim 2, wherein the at least one lighting system integrated and positioned longitudinally on both sides of a front surface of the geodetic levelling staff.

4. The geodetic levelling staff according to claim 3, wherein the at least one lighting system comprising at least one lighting unit.

5. The geodetic levelling staff according to claim 3, wherein the at least one lighting system comprising a mirror reflector attached to the at least one lighting system.

6. The geodetic levelling staff according to claim 3, wherein the at least one power source further provides the power to the at least one lighting system.

7. The geodetic levelling staff according to claim 2, wherein the at least one lighting system comprising at least one lighting unit.

8. The geodetic levelling staff according to claim 7, wherein the at least one lighting unit comprises a plurality of light emitting diodes spaced apart from each other and disposed along a longitudinal direction of the geodetic levelling staff, and
wherein the at least one control circuit is further configured to turn the at least one lighting system on in response to the detected data indicating that the geodetic levelling staff is in a vertical position.

9. The geodetic levelling staff according to claim 8, wherein the at least one lighting system comprising a mirror reflector attached to the at least one lighting system.

10. The geodetic levelling staff according to claim 7, wherein the at least one lighting system comprising a mirror reflector attached to the at least one lighting system.

11. The geodetic levelling staff according to claim 2, wherein the at least one lighting system comprising a mirror reflector attached to the at least one lighting system.

12. The geodetic levelling staff according to claim 2, wherein the at least one power source further provides the power to the at least one lighting system.

13. The geodetic levelling staff according to claim 2, wherein the at least one power source further provides the power to the at least one lighting system, and
wherein the at least one level detection unit and the at least one circular level are separate units spaced apart from one another and disposed along a back surface of the geodetic levelling staff, the back surface being a surface not seen by a surveyor using the level.

14. The geodetic levelling staff according to claim 1, further comprising a beacon.

15. A method for measuring a height with a geodetic levelling staff according to claim 1, comprising the following steps:
a) sending a light beam directly to a center of the at least one circular level by the at least one level detection unit,
b) detecting information that the geodetic levelling staff is in a vertical position by the at least one level detection unit when a bubble is at the center of the at least one circular level,
c) collecting the detected data received from the at least one level detection unit by the at least one control circuit,
d) transmitting the detected data to the at least one near field communication tool,
e) transmitting the detected data received from the at least one control circuit to the level by the at least one near field communication tool, and
f) performing a geodetic levelling by the level when the detected data transmitted from the at least one near field communication tool to the level, indicates that the bubble of the level is at the center.

16. The method according to claim 15, further comprising the step of turning a lighting system on by the at least one control circuit when the detected data indicates that the bubble is at the center of the at least one circular level.

17. The method according to claim 15, wherein the at least one near field communication tool uses a ZigBee transmission, a Bluetooth transmission and/or wireless fidelity transmission technologies.

18. The method according to claim 17, wherein the at least one near field communication tool uses the Bluetooth transmission.

19. The method according to claim 15, further comprising the step of flashing a beacon on by the at least one control circuit when the detected data indicates that the bubble of the level is at the center.

20. A system for measuring a height, comprising the geodetic levelling staff according to claim 1 and the level comprising a receiver configured to receive the detected data from the at least one near field communication tool of the geodetic levelling staff, the level further comprising a software program configured to stop the level from performing a measurement in response to the received detected data indicating that the geodetic levelling staff is not in a vertical position, and configured to allow the level to perform a measurement in response to the received detected data indicating that the geodetic levelling staff is in a vertical position.

* * * * *